United States Patent [19]

Stidworthy

[11] Patent Number: 4,856,370
[45] Date of Patent: Aug. 15, 1989

[54] VARIABLE PHASE COUPLINGS

[76] Inventor: Frederick M. Stidworthy, 2 Butlers Close, Long Compton Nr. Shipston-on-Stour, CV36 5JY, Warwickshire, England

[21] Appl. No.: 91,511

[22] PCT Filed: Dec. 3, 1986

[86] PCT No.: PCT/GB86/00736

§ 371 Date: Jul. 30, 1987

§ 102(e) Date: Jul. 30, 1987

[87] PCT Pub. No.: WO87/03715

PCT Pub. Date: Jun. 18, 1987

[51] Int. Cl.$^4$ ............... F16H 37/06; F16H 37/08
[52] U.S. Cl. .......................... 74/675; 74/713; 74/714
[58] Field of Search ............... 74/675, 417, 713, 714

[56] References Cited

U.S. PATENT DOCUMENTS

| | | | |
|---|---|---|---|
| 3,298,251 | 1/1967 | Moss | 74/675 X |
| 3,429,201 | 2/1969 | Zucchellini | 74/675 |
| 3,766,790 | 10/1973 | Weir | 74/675 X |
| 3,926,072 | 12/1975 | Richardson | 74/675 X |
| 4,279,177 | 7/1981 | Yamashita | 74/675 |
| 4,425,815 | 1/1984 | Morton et al. | 74/425 |
| 4,574,656 | 3/1986 | McCarthy et al. | 74/675 |
| 4,590,712 | 5/1986 | Sugiyama et al. | 74/675 X |
| 4,633,735 | 1/1987 | Sakurai et al. | 74/675 |

FOREIGN PATENT DOCUMENTS

| | | | |
|---|---|---|---|
| 572897 | 1/1932 | Fed. Rep. of Germany | 74/675 |
| 729279 | 12/1942 | Fed. Rep. of Germany . | |
| 17992 | 1/1914 | France | 74/675 |
| 593322 | 8/1925 | France . | |
| 1087924 | 3/1955 | France | 74/675 |
| 593813 | 10/1947 | United Kingdom | 74/675 |
| 833515 | 4/1960 | United Kingdom | 74/675 |
| 2167123 | 5/1986 | United Kingdom . | |

*Primary Examiner*—Dwight G. Diehl
*Attorney, Agent, or Firm*—Marshall, O'Toole, Gerstein, Murray & Bicknell

[57] ABSTRACT

An assembly capable of varying the relative phase of rotation between a driving sprocket wheel and a camshaft comprises a carrier fixed to the sprocket wheel and carrying compound idler bevel gears including inner idler gears which mesh with a bevel gear fixed to the camshaft to impart rotation to the camshaft and including outer idler gears which mesh with a ring gear carried by a sleeve shaft which is adjustable in angular position by a worm gear and a worm-wheel arrangement to vary the phase of the camshaft rotation relative to the phase of the sprocket wheel rotation.

11 Claims, 2 Drawing Sheets

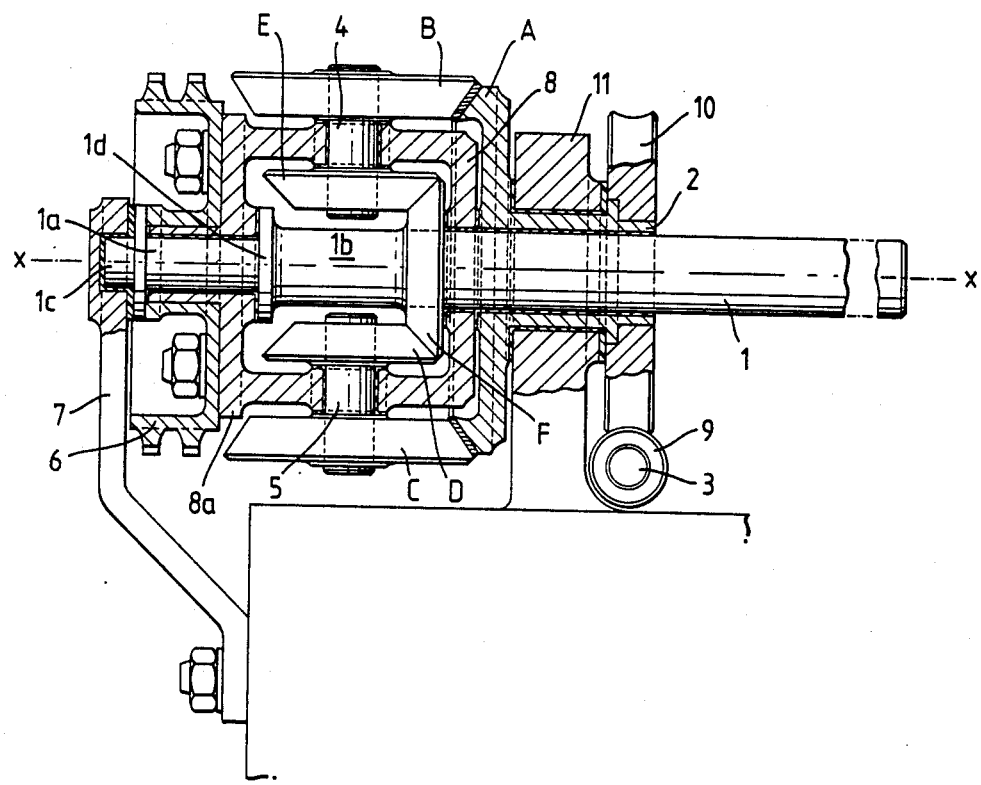

VARIABLE PHASE COUPLINGS

This invention relates to mechanical devices of the type to be used in camshaft management systems, and any situation wherein it is considered desirable for one shaft, or associated component, to be subjected to phase alteration, or adjustment, in relation to another shaft or component, or group of components.

The ability to provide advance/retard characteristics in respect of rotating shafts and/or assemblies, enables the internal combustion engine designer to contemplate engines capable of higher power outputs, lower specific fuel consumptions, and cleaner exhaust emission profiles. In short, the ability to vary the valve timing alone, i.e. the shaft advance/retard status, will, in itself, offer considerable environmental and performance advantages.

The devices included in this specification are examples of the basic invention, and are embodiments slanted towards the automotive industry. However, their ability to provide variable phase coupling allows the inclusion to be contemplated in respect of a much wider envelope; i.e. they can be used in any situation wherein it is necessary, or desirable, to vary the rotational status of a component, or shaft, in rotational relationship with another.

According to the present invention there is provided an assembly capable of producing phase alteration between two rotatable members in which a first rotatable member acts, through a bearing contact, on a second rotatable member in order to impart rotation to a third rotatable member, the second rotatable member being coupled to the third rotatable member by a drive element rotatable with the third rotatable member, and drive means, drivingly engaged with the second rotatable member, comprising actuating means for imparting rotational movement to a fourth rotatable member to provide a relative change of phase between the first and third rotatable members.

According to a second embodiment of the present invention there is provided an assembly capable of producing phase alteration between two rotatable members comprising a first rotatable member acting on a second rotatable member in order to impart rotation to a third rotatable member and a drive mechanism engaging with the second rotatable member and comprising actuating means to reposition an associated drive member in order to introduce rotational adjustment or drive to the second rotatable member in order to provide a relative change of phase between the first rotatable member and the third rotatable member.

For a better understanding of the present invention, and to show how the same may be put into effect, reference will now be made by way of example, to the accompanying drawings, in which:

FIG. 1 is a basic example of one embodiment of the principles of the invention;

FIG. 2 is a variation on FIG. 1 including only four geared items;

Figure 3:
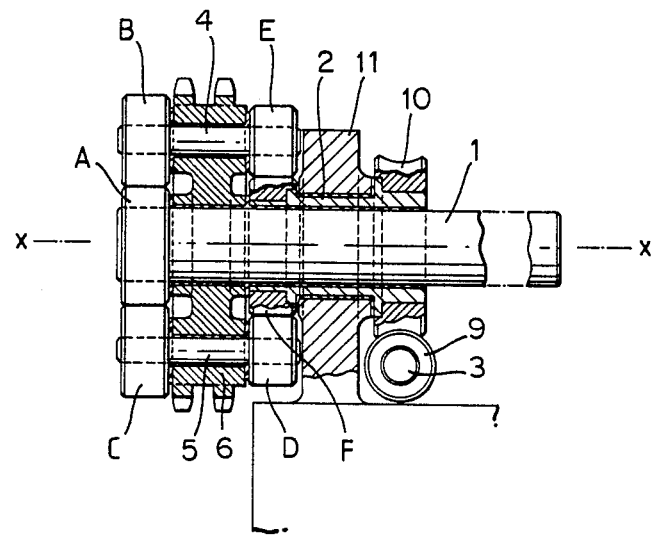
FIG. 3 is a further variation on FIG. 1.

Referring now to the drawings FIG. 1 is a design concerned with camshaft phase variation. The camshaft 1 is bearing located along the center rotational datum axis of the device, and is fixed to, or part of, bevelled gear F. Camshaft 1 is extended to form shafts $1b$, $1a$ and $1c$, these being fixed to, or part of camshaft 1. Collar $1d$ is likewise fixed to, or part of camshaft 1. Gear A is mounted upon sleeve shaft 2, which is concentrically bearing located upon camshaft 1, both shafts passing through the main journal housing 11.

Compound idler-bevels B and E are fixed to, or part of axle 4, and compound idler-bevels C and D are fixed to, or part of, axle 5. The assemblies (B/4/E) and (C/5/D) are free-running and bearing located radially within free-running carrier 8. Gears B and C are engaged with gear A, and gears E and D are engaged with gear F. A sprocket 6 is free-running upon shaft $1a$ and is mounted upon a concentric sleeve-shaft and held in bearing contact by the collar $1d$. Fixed to the sleeve-shaft (this being fixed to, or part of the sprocket 6), is the carrier 8 which provides the radial bearing locations for the free-running axles 4 and 5.

The ratio between gears (E/F/D) is 1:1; i.e. all three gears have the same number of teeth (for example 15) while gears B and C will, in this example, have 20 teeth each, and gear A will have 30 teeth. This particular combination provides a 2:1 reduction between the input (in this case sprocket 6) and the output (in this case camshaft 1). Furthermore, the engagement sequence indicated also causes camshaft 1 to be reversed. Therefore, for each revolution of the input (sprocket 6) the output (camshaft 1) will rotate one half time in the opposite direction.

The actuating means comprises a worm-wheel 10 which is fixed to, or part of, sleeve-shaft 2, and is engaged with worm 9, this being provided with its own drive shaft 3 which can be driven by suitable means (for example an electric motor which is controllable). The lead angle between the worm-wheel and worm, is of approximately 10° i.e. sufficient to provide a "locking angle".

Therefore, gear A can be held in a "locked" position by the worm/worm-wheel combination and can be repositioned, at will, by drive applied in either direction to the worm 9 via the drive shaft 3. By this means, the camshaft 1 can be advanced and/or retarded by any degree, at any time, and under any through-drive conditions in order to vary the phase relationship between the input (sprocket 6) and the output (camshaft 1).

In FIG. 2, gear $A_2$ is fixed to, or part of, camshaft 1 and gear $C_2$ is fixed to, or part of shaft $1_a$ which is in turn fixed to, or part of, sprocket 6 by way of backing plate $6_a$ and is bearing located within the main journal housing 11. Gears $B_2$ and $D_2$ are both fixed to, or part of, the transverse axle 24, this being cross-mounted within bearing locations supported within the main carrier which is a free to run device, datum supported upon location stub-axles 20, and restrained only by the worm-wheel outer periphery section 8 and its engagement with worm 9. Worm 9 is again provided with its own drive shaft 3 and is, therefore, capable of being driven in either direction by any rotational degree.

Gears $C_2$ and $D_2$ engaged at a ratio of 1:1, and gear $B_2$ is engaged with gear $A_2$ at a ratio of 2:1. Therefore, any rotation of shaft 3 by any means (sprocket or otherwise), will result in the output (camshaft 1) being rotated in the same direction, but at half the speed. Phase variation can be adjusted by applying drive to the worm 9 via drive shaft 3 and thus adjusting the position of the transverse axle which is interposed between the input (sprocket 6) and the output (camshaft 1).

In the event of both pairs of gears ($C_2$ and $D_2$) and (A and B) being in a 1:1 ratio, this arrangement would provide an excellent clutching device.

FIG. 3 is a variation of FIG. 1, wherein the bevelled gears are replaced by spur gears. In this case, sprocket 6 provides both input capability and carrier characteristics for the two parallel lay-shafts 4 and 5 which are bearing located within the sprocket 6. Camshaft 1 is fixed to, or part of gear A. Gears B and E are fixed to, or part of, lay-shaft 4 and gears C and D are fixed to, or part of, lay-shaft 5. Gears B and C are engaged with gear A, gears B and C, in this example, having 18 teeth each and gear A having 24 teeth. Gears D and E have, in this example, 14 teeth each, and are engaged with sun-gear F this having 28 teeth. Gear F is fixed to, or part of, sleeve-shaft 2, which is, in turn, fixed to, or part of, worm-wheel 10.

One single rotation of sprocket/carrier 6, will cause the output (camshaft 1) to rotate one half revolution in the opposite direction. Phase adjustment can be made at any time, and any speed via the worm, worm/wheel device (7/6/5). Any suitable means for providing a locking/repositioning mechanism can be included, i.e. a normal screw thread assembly etc. This example is very small, simple and compact and offers full (360°) adjustment, together with a 2:1 drive capability.

Figure 4:
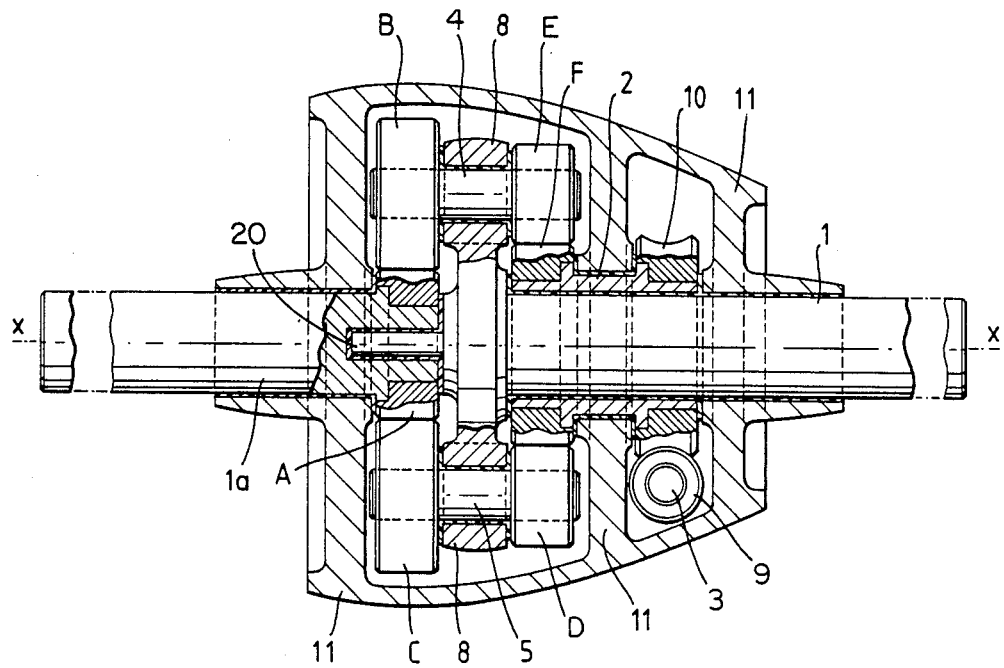
FIG. 4 shows a clutching device encompassing the principles of the invention.

FIG. 4 is included in the description to show how the principles of the invention may be applied to a clutching mechanism. The device shown in FIG. 4 is capable of providing a clutching mechanism between the driving and driven portions of the power train of a motor vehicle.

The ratios included are hypothetical, but they provide a 1:1 input/output situation.

Input shaft 1 is fixed to, or part of, carrier 8 and location shaft $1_a$. Sun-gear A is fixed to, or part of, output shaft $1_a$. Gears B and E are fixed to, or part of, lay-shaft 4 and gears C and D are fixed to, or part of, lay-shaft 5. Gears A/B/C are engaged at a ratio of 1:1 and in this example have 18 teeth each. Gears D/E/F are engaged, with gears D and E having 12 teeth each and sun-gear F having 24 teeth. Gear F and worm-wheel 10 are fixed to, or part of, sleeve-shaft 2 and worm 9 is provided with a drive shaft 3 for rotational displacement of sun-gear F.

The outer case 11 is assumed to be lubrication tight and fixed to "earth".

If a single rotation is applied to shaft 1, in either direction, then gears D and E will be caused to "walk" once around gear F and, as they are engaged at a ratio of 2:1, they will individually rotate twice. This causes lay-shafts 4 and 5 to rotate twice, and compound planets B and C also rotate twice. Gears A/B/C have an equal number of teeth. Therefore, the two revolutions applied to gears B and C will cause them to use up one of those revolutions in "walking" around gear A in order to comply with the demands of the carrier 8. The second revolution, however, will cause gear A to rotate once, in a direction opposite to that of the input shaft 1, thereby creating a 1:1 through drive situation. If drive is applied to shaft 3, in either direction, shaft $1_a$ can be accelerated or declerated, according to the direction of drive applied to shaft 3 and the duration of applied drive will also decide the duration of the phase change between shafts $1_a$ and 1.

For example, if the input shaft/carrier (1/8) is rotated once, and gears B and C "walk" around gear A once, lay-shafts 4 and 5 will rotate once only. Therefore, gears D and E will also rotate only once. This means that only 12 teeth are capable of "walking" around gear F. If gear F were now rotated one half revolution, by way of the worm drive (7/10) and sleeveshaft 2, in the same direction as input shaft 1, then the 12 tooth anomaly would disappear and gears B and C could "walk" around gear A without causing it to rotate. However, if the drive to shaft 3 were reduced, even slightly, then drive would commence in shaft $1_a$. Therefore, if drive to shaft 3 were gradually reduced, then drive could be instigated in shaft $1_a$ on an equally gradual basis, thereby providing perfect clutching between 1 and $1_a$ without the traditional, and energy consuming, "slipping" normally associated with clutch engagement.

This means that any reduction in through-drive status can be achieved, from 1:1 to zero, and the frictional build-up will no longer be instrumental in the engagement, therefore, a more efficient clutch can be contemplated, and an infinitely variable coupling established. Different through gear ratios may be included, such as for providing an "overdrive" output, for example 1:1.5, upon the stationary status of shaft 3 being achieved. Furthermore, were shaft 3 to be given more revolutions than the one half:1 situation already described, then a reverse of shaft $1_a$ could be incorporated.

A further variation, would be to incorporate two devices such as those shown in FIG. 4, with a differential drive established between the two carriers. This would ensure that forward rotation of the carrier attached to the input shaft would be reversed in the second coupled carrier. The output shaft would be provided with gears such as gear A and the output from both carriers, via their respective gearing, would be applied to the same output shaft. However, depending upon which worm/worm-wheel was "active" would depend upon which carrier was clutched, i.e. as the reverse direction would provide different directional characteristics, the negating of one worm "lock" and the instigation of the other, would provide immediate reverse. This assembly would provide an excellent tank drive.

All ratios included in this description are purely hypothetical, and substitutions can be made, according to requirement. All devices included in this specification can be considered "clutches".

I claim:

1. A drive assembly comprising a driving member supported for rotation about a first axis; a driven member supported for rotation about the first axis; a drive element fixed to the driven member; transmission means coupling the driving member to the drive element for rotating the driven member in response to rotation of the driving member; and phase adjusting means for adjustably setting the relative angular positions of the driven member and the driving member about the first axis in order to select the phase of rotation of the driven member relative to the rotation of the driving member; said transmission means comprising a transmission shaft rotatable about a second axis and rotatable with the driving member about the first axis and a transmission element fixed to the transmission shaft for rotation therewith about the second axis and drivingly engaged with the drive element to rotate the driven member upon rotation of the driving member; said phase adjusting means comprising an adjusting element fixed to the transmission shaft for rotation therewith, a setting member supported for rotation about the first axis and drivingly engaged with the adjusting element, and unidirectional actuating means for adjusting the angular position of the setting member about the first axis and thereby rotating the transmission shaft in order to select and then maintain a desired phase of rotation of the driven member relative to the rotation of the driving member.

2. An assembly according to claim 1 wherein the transmission means comprises a pair of transmission shafts rotatable about the second axis and rotatable with the driving member about the first axis, each transmission shaft carrying a respective transmission element drivingly engaged with the drive element of the driven member and a respective adjusting element drivingly engaged with the rotatable setting member.

3. An assembly according to claim 2 wherein the second axis is perpendicular to the first axis.

4. An assembly according to claim 3 wherein each of the drive element, the transmission elements, the adjusting elements and the setting member is a bevel gear.

5. An assembly according to claim 2 wherein the second axis is parallel to the first axis.

6. An assembly according to claim 5 wherein each of the drive element, the transmission elements, the adjusting elements and the setting member is a spur gear.

7. An assembly according to claim 1 wherein each of the drive element, the transmission element, the adjusting element and the setting member is a gear wheel.

8. An assembly according to claim 1 wherein the unidirectional actuating means comprises a worm wheel fixed to the setting member for rotation therewith about the first axis and a worm engaged with the worm wheel for rotating the worm wheel to adjust the angular position of the setting member about the first axis.

9. An assembly according to claim 1 wherein the driving member is a sprocket wheel and the driven member is a camshaft.

10. An assembly according to claim 9 comprising a carrier fixed to the sprocket wheel for rotation therewith about the first axis and provided with bearings supporting the transmission shaft for rotation about the second axis.

11. An assembly according to claim 9 wherein the sprocket wheel is provided with bearings supporting the transmission shaft for rotation about the second axis.

* * * * *